United States Patent [19]

Suzuki

[11] Patent Number: 4,829,845
[45] Date of Patent: May 16, 1989

[54] ANCHORING ASSEMBLY FOR A CONTROL CABLE

[75] Inventor: Kazuhiro Suzuki, Nishinomiya, Japan

[73] Assignee: Nippon Cable System Inc., Hyogo, Japan

[21] Appl. No.: 151,050

[22] Filed: Feb. 1, 1988

[30] Foreign Application Priority Data

Feb. 6, 1987 [JP] Japan .................................. 62-27040

[51] Int. Cl.$^4$ .............................................. F16C 1/10
[52] U.S. Cl. ................................ 74/502.4; 188/196 D
[58] Field of Search ........................... 74/501.5, 502.4; 188/196 R, 196 D, 196 P; 192/111 A, 111 B; 411/182

[56] References Cited

U.S. PATENT DOCUMENTS

| | | | |
|---|---|---|---|
| 3,366,405 | 1/1968 | Severence | 74/501 D X |
| 3,572,159 | 3/1971 | Tschanz. | |
| 4,006,802 | 2/1977 | Evans | 188/196 D |
| 4,014,415 | 3/1977 | Pickel | 188/196 D |
| 4,175,450 | 11/1979 | Bennett. | |
| 4,177,691 | 12/1979 | Filmore. | |
| 4,185,516 | 1/1980 | Betlinski | 74/501 D X |
| 4,263,998 | 4/1981 | Moriya | 74/501 D |
| 4,344,518 | 8/1982 | Gilmore | 192/111 A |
| 4,378,713 | 4/1983 | Haskell et al. | 188/196 R X |
| 4,543,849 | 10/1985 | Yamamoto et al. | 74/501.5 R |

Primary Examiner—Peter A. Aschenbrenner
Attorney, Agent, or Firm—Armstrong, Nikaido, Marmelstein, Kubovcik & Murray

[57] ABSTRACT

The anchoring assembly comprises a sleeve to be coaxially fixed to one end of a conduit of a push-pull control cable from which an operating end of an inner cable projects, and having an external thread on an outer surface thereof. A locknut has an internal thread on the inner surface thereof engaging with the external thread of the sleeve, and is capable of being rotated and accordingly moved axially by an external force along an axis of the sleeve. A brake piece is movably passed through slidably by the sleeve in such a manner that a rotating movement thereof is restricted, which prevents the locknut from rotating. An outer cap comprises a holder and a snap-in device. The holder holds the brake piece and the locknut. The snap-in device has a snap portion. The brake piece and the locknut can be pressed against a rear side periphery of a penetrating hole of a bracket when the outer cap is inserted into the penetrating hole from the rear side and the snap portion expands to catch a front side periphery of the penetrating hole of the bracket.

5 Claims, 3 Drawing Sheets

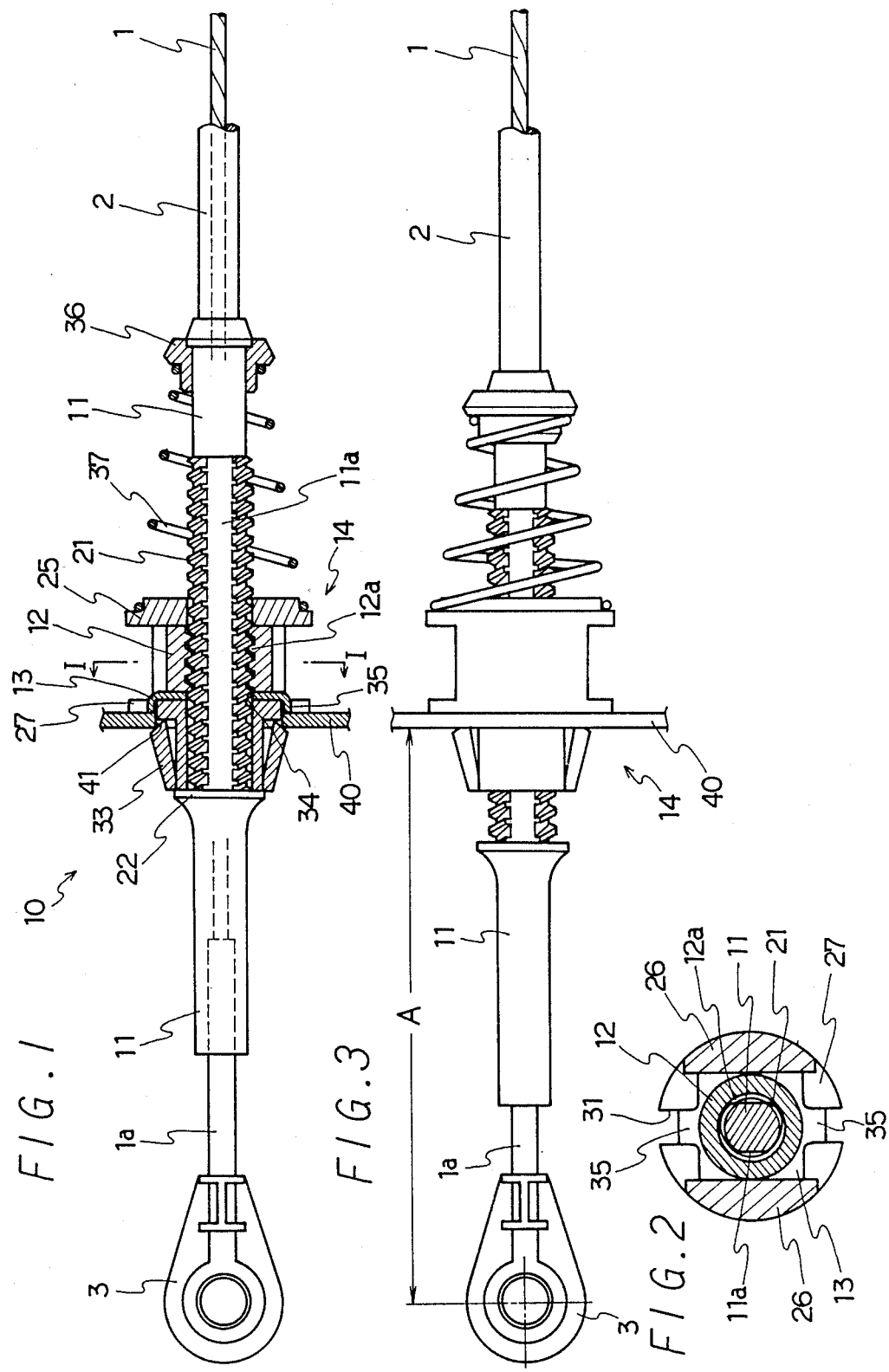

ANCHORING ASSEMBLY FOR A CONTROL CABLE

BACKGROUND OF THE INVENTION

The present invention relates to an anchoring assembly for a control cable, and more paticularly to an anchoring assembly capable of automatically adjusting an anchoring position for a push-pull control cable which is used for transmission of a push-pull operational force to an operated device.

In case of using a control cable comprising an inner cable and a conduit as a means to transmit an operational force to an operated device, when the inner cable is connected to connecting points of an operated device an end of the conduit must be anchored at correct position determined in accordance with the specified effective length of the inner cable. However in general, the actual lengths thereof usually contain some errors because it is difficult to produce an inner cable and a conduit having specified accurated lengths. Therefore, when a control cable is connected to an operated device, an adjustment of the anchoring position of the conduit relative to the end of the inner cable is always required so that the end of the inner cable and the end of the conduit can be accurately positioned on the basis of the actual lengths thereof.

As an anchoring assembly capable of adjusting an anchoring position of a control cable, an anchoring assembly is disclosed, for example, in U.S. Pat. No. 4,175,450. FIG. 10 shows the above conventional assembly.

In the above anchoring assembly 50, as shown in FIG. 10, an adjusting member 52 is attached to an end of a conduit 51 of a control cable, and a rack portion 53 having teeth is formed on the longitudinally extending bottom surface of the adjustment member 52. An inner cable 54 of a control cable is passed through the inside of the adjustment member 52 and extended toward the left side in FIG. 10, so that it can be connected to an operated device (not shown). The adjustment member 52 is disposed inside of a fitting member 55. The fitting member 55 can be fixed to a bracket 57 by virtue of a snap portion 56 formed at the front end thereof. A guideway 58 is formed in the fitting member 55 so that a locking member 59 is disposed therein. The locking member 59 is provided with an aperture 61 through which the adjustment member 52 can pass, and teeth 62 capable of engaging with the rack portion 53 are provided on the inside surface of the lower half of the aperture 61. The numeral 63 indicates a spring to urge the teeth 62 of the locking member 59 against the adjustment member 52.

In the anchoring assembly 50, first the inner cable 54 is connected to an input end of the operated device with the locking member 59 being pressed to allow the axial movement of the fitting member 55 relative to the adjustment member 52, second the fitting member 55 is fixed to the bracket 57 and finally the adjustment of the anchoring position for a conduit is completed by releasing the locking member 59. The fitting member 55 can be moved relatively to the adjustment member 55 by pressing the locking member 59. After the adjustment of the anchoring position of the conduit is completed, the locking member 59 is released so that the teeth 62 of the locking member 59 is engaged with the rack portion 53 of the adjustment member 52 with the assistance of the spring 63, therefore the conduit can be anchored at the correct position.

In the above mentioned conventional assembly, when the connection of an inner cable and the anchoring of a conduit are performed, the locking member 59 must be depressed at the same time the whole assembly is axially pushed. Moreover, the adjustment is performed only in a step-wise manner determined by the dimension of the engaging teeth. Therefore, an anchoring work is troublesome and an efficiency of an assembly line is markedly decreased especially when the anchoring work is performed in a narrow space.

It is an object of the present invention to provide an anchoring assembly which enables to adjust the anchoring position of a conduit in a step-less manner only by pushing the anchoring assembly in the axial direction.

SUMMARY OF THE INVENTION

The anchoring assembly of the present invention comprises;

(a) a sleeve to be coaxially fixed to one end of a conduit of a push-pull control cable from which an operating end of an inner cable projects, and having an external thread on an outer surface thereof;

(b) a locknut having an internal thread on an inner surface thereof engaging with the external thread of the sleeve, and capable of being rotated and accordingly moved axially by an external force along an axis of the sleeve;

(c) a brake piece having a hole and being passed through slidably by the sleeve in such manner that a rotating movement of the brake piece is restricted, which prevents the locknut from rotating; and (d) an outer cap comprising a holder and a snap-in means having a longitudinal bore in order to allow the sleeve to pass through slidably, the holder holding the brake piece and the locknut, tee snap-in means having a snap portion, wherein the brake piece and the locknut can be pressed against a rear side periphery of a penetrating hole of a bracket when the outer cap is inserted into the penetrating hole from the rear side and the snap portion expands to catch a front side periphery of the penetrating hole of the bracket.

In the anchoring work of the present invention, firstly a control cable is passed through the penetrating hole of bracket so that the end of the inner cable is connected to the connecting point of the operated device, and secondly the outer cap is inserted from the rear side into the front side.

Hereinafter, the left-handed side of the bracket in the figures is referred to as the front side and the right-handed side thereof is referred to as the rear side.

In process of insertion of the outer cap, that is to say, before the outer cap is fixed to the bracket, the locknut can be freely rotated around the sleeve, therefore the outer cap can be easily moved along the axis of the sleeve. On the contrary when the outer cap is inserted into the penetrating hole of the bracket so that the outer cap is fixed to a bracket by means of the snap portion, the locknut cannot be rotated by the friction between the brake piece and the locknut because the brake piece and the locknut are pressed against the rear side periphery of the penetrating hole of the bracket by the elastic force of the snap portion. One the locknut cannot be rotated, the sleeve engaging with the locknut cannot be moved relatively to the outer cap in an axial direction thereof. Therefore, the sleeve can easily be fixed so that the end of the conduit is anchored at the correct position.

According to the present invention, the anchoring position of a conduit can be adjusted in a step-less manner only by pushing the anchoring assembly in the axial direction thereof, and therefore the adjustment and the anchoring can be carried out simultaneously only by a pushing operation.

BRIEF DESCRIPTION OF THE DRAWINGS

The features and advantages of the anchoring assembly of the present invention will become more clearly appreciated from the following descriptions in conjunction with the accompanying drawings, in which:

FIG. 1 a side view of an anchoring assembly of an embodiment of the present invention showing the major portion in section;

FIG. 2 is a cross-sectional view taken along the plane indicated as the line I—I in FIG. 1;

FIG. 3 is a side view of the anchoring assembly in FIG. 1 showing that a sleeve projects from an outer cap;

DETAILED DESCRIPTION

Figure 9:
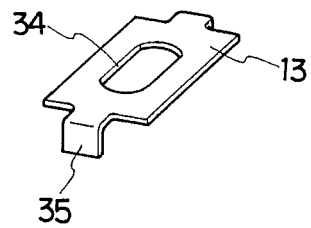
FIG. 9 is a perspective view or a brake piece of FIG. 1.

Next, there is explained an embodiment of the present invention. Although the present invention can be applied to mechanical devices of any field wherein an operational force is transmitted to an operated device by a control cable, there is hereinafter explained an anchoring assembly applied to a control cable which is employed as a remote control device for an automatic transmission in an automobile.

In the above remote control mechanism of an automatic transmission, an inner cable of the control cable is connected to a spool of a hydraulic control valve, and a gear-change operation is carried out by moving the spool forward or backward in several millimeter. Adjustment of an anchoring position for the conduit in the above mechanism requires a severe accuracy, because an error of ±1 mm in the position of the spool center lowers a stability of a neutral position and a reliability of the gear-change operation.

An anchoring assembly shown in FIGS. 1 and 2 is adapted to such a control cable for remotely operating the automatic transmission.

In FIG. 1, the numerals 1 and 2 denote an inner cable and a conduit respectively, which constitute a control cable. A guide rod 1a having an end fitting 3 to be connected to the input end of the automatic transmission (not shown) is fixed to the end of the inner cable 1. The anchoring assembly 10 as the embodiment of the present invention is attached to the end of the conduit 2.

The anchoring assembly 10, in general, comprises a sleeve 11, a locknut 12, a brake piece 13, and an outer cap 14.

The sleeve 11 fixed to the end of the conduit 2 has a hollow cylindrical shape, and a multiple thread 21 is formed on a longitudinally extending surface thereof in the middle (in FIG. 1). The multiple thread 21 is engaged with an internal thread 12a of the locknut 12. Since the multiple thread 21 and the internal thread 12a of the locknut 12 have a large lead angle (for example, about 30°), when the locknut 12 is pressed in an axial direction of the sleeve 1,, the locknut 12 can be rotated and moved easily.

Further, parallel portions 11a are formed on the side surface of the sleeve 11, of which the cross section has such a shape that the both sides of a circle is parallel by cutting away (hereinafter referred to as plained circular shape). A flange 22 is formed on the left side (in FIG. 1) end of the multiple thread.

Figure 4:
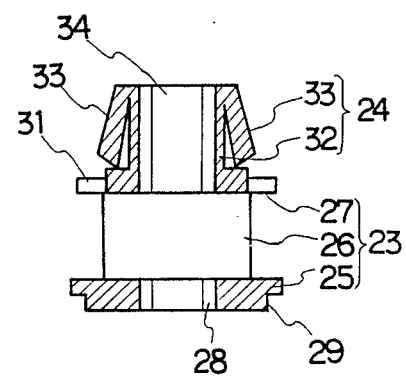
FIG. 4 is a sectional view of the outer cap of FIG. 1.

Next there is explained the outer cap 14. As shown in FIG. 4, the outer cap114 comprises a holder 23 and a snap-in means 24. The holder 23 comprises a bottom 25, a side wall 26, and an abutment 27. The holder 23 has a space to contain the locknut 12 and the brake piece 13.

Figure 6:
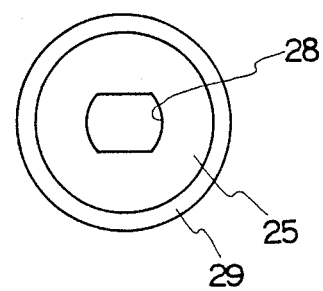
FIG. 6 is a bottom view of the outer cap of FIG. 1.
Figure 10:
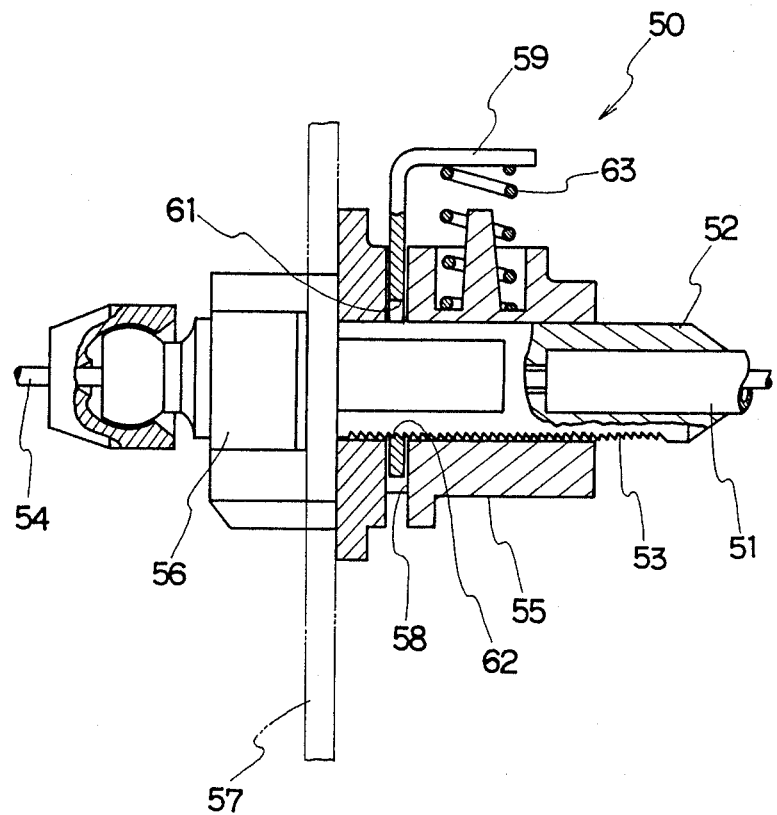
FIG. 10 is a sectional view illustrating an example of a conventional anchoring assembly.

As shown in FIG. 6, the bottom 25 having a disk-shape is provided with the hole 28 at the center portion thereof. The cross section of the hole 28 has a plained circular shape similar to the cross section of the sleeve 11 in order to pass the sleeve 11 in such a manner that the sleeve can not rotate. Further, a flange 29 is formed at the periphery of the upper portion of the bottom 25, which receives an end of a spring 37 mentioned later.

Figure 8:
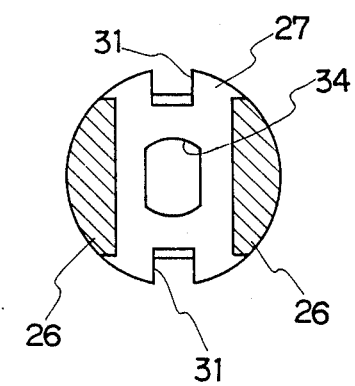
FIG. 8 is a cross-sectional view taken along the plane indicated as the line II—II in FIG. 7.

As shown in FIG. 8, the side walls 26 comprises a pair of members connecting the bottom 25 with the abutment 27 and has a nearly semicircular cross section.

Figure 5:
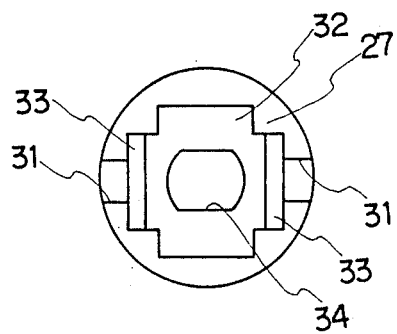
FIG. 5 is a plan view of the outer cap of FIG. 1.
Figure 7:
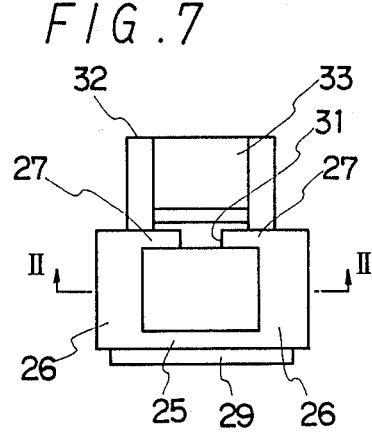
FIG. 7 is a front view of the outer cap of FIG. 1.

As shown in FIGS. 5 and 8, the abutment 27 of a disk-shape has cuttings 31 formed at both sides thereof symmetrically. The cuttings 31 are provided to prevent the rotation of the brake portion 13 by means of engagement thereof with legs 35 of the brake portion 13.

As shown in FIGS. 4 and 5, the snap-in means 24 comprises a block 32 on the abutment 27 and a snap portion 33. The block 32 has a cubical shape, in which a hole 34 is bored at the center portion thereof. The hole 34 having a plained circular shape similar to the hole 28 of the bottom 25 is provided to prevent the sleeve 11 from rotating when the sleeve 11 is inserted. The snap portion 33 is provided to fix the anchoring assembly 10 to a bracket 40 by its elastic force.

FIGS. 1 and 2 show the above mentioned outer cap 14 fixed to the bracket 40. The brake piece 13 and the locknut 12 are disposed between the abutment 27 and the bottom 25 of the outer cap 14.

As shown in FIG. 9, the brake piece 13 is an approximately square shaped plate, and is bored to form a hole 34 at the center portion thereof in order to allow the sleeve 11 to pass through. In addition, legs 35 are formed on the both side edges of the brake portion 13.

As shown in FIG. 1, the internal thread 12a of the locknut 12 is engaged with the multiple thread 21. A support 36 is fixed to the right end of the sleeve 11 in FIG. 1. A spring 37, which is a compression spring, is inserted between the support 36 and the bottom 25 so that the spring 37 applies a force to the sleeve 11 in order to urge the sleeve 11 in the right direction in FIG. 1. In this connection, the spring 37 may press the outer cap 14 against the rear side periphery of penetrating hole 41 of the bracket 40, but of course the spring 37 is not too strong for the outer cap 14 to snap into the hole 41 during the connecting operation of the end fitting 3 of the inner cable 1.

In FIG. 1, the numeral 40 denotes a bracket having a penetrating hole 41. In the figure, the anchoring assembly 10 is in the condition that the anchoring operation is completed, wherein the snap portion 33 of the outer cap 14 catches on to the front side periphery of the penetrating hole 41 of the bracket 40. Under this condition, the elastic force of the snap portion 33 is transmitted from the bottom 25 to the locknut 12, then to the brake portion 13, and finally to the bracket 40, one after another, so that the locknut 12 firmly abutts against the brake portion 13 and thereby the locknut 12 is not allowed to rotate because of the friction resistance between the brake portion 13 and the locknut 12. When the rotation of the locknut 12 is not allowed, the movement of the sleeve 11 is prevented and accordingly the conduit is anchored to the correct anchoring position. An driving device which applies the push-pull operational force to the inner cable 1 is not shown in FIG. 1, but connected to the right-handed end of the conduit 2.

Next, referring to FIGS. 1 and 3, there is explained the function of the anchoring assembly 10 of the present invention.

In the anchoring operation of the control cable, first the inner cable is passed through the penetrating hole 41 of the bracket 40 from the rear side to the front side with the guide rod 1a taking the lead, and the end fitting 3 of the guide rod 1a is connected to the input end of the automatic transmission device. Another side of the input end is connected to the spool of a hydraulic control valve for control of the gear-change operation. When the input end connected with the end fitting 3 is held at the neutral position, the correct anchoring position for the conduit is temporarily decided. During the above operation, the sleeve 11 and the conduit 2 are compressed in the right-handed side by virtue of the spring 37, and the inner cable 1 is stretched, since the guide rod 1a and the end of the inner cable 1 cannot move. Therefore, a play between the conduit 2 and the inner cable 1 can be advantageously absorbed, i.e. the play is biased to one side.

Second the conduit 2 is fixed to the bracket 40 by insertion of the outer cap 14 from the rear side of the penetrating hole 41. As mentioned above, the locknut 12 housed in the outer cap 14 can freely rotate and move on the sleeve 11 until the outer cap 14 is fixed to the bracket 40. Therefore, the outer cap 14 can be inserted into the penetrating hole 41 while the anchoring position for the conduit 2 is temporarily decided. When the outer cap 14 is completely inserted into the penetrating hole 41, the snap portion 33 can catch the front side periphery of the penetrating hole 41 of the bracket 40 so that the outer cap 14 is fixed to the bracket 40.

As mentioned above, when the outer cap 14 is fixed to the bracket 40, the brake portion 13 and the locknut 12 is pressed against the rear side of the bracket 40 so that the locknut 12 is not allowed to rotate by virtue of the friction resistance between the locknut 12 and the brake portion 13. In this way, when the locknut 12 is not allowed rotate, the sleeve 11 can not move relatively to the bracket 40 in a axial direction thereof. Therefore, the sleeve 11 is fixed, keeping its position at the above temporarily decided correct anchoring position, so that the conduit 2 is also fixed at the correct position.

As mentioned above, according to the anchoring assembly 10 of the present invention, the inner cable 1 and the conduit 2 of the control cable can be fixed to the correct anchoring position only by the outer cap 14 being pressed into the penetrating hole 41. That is to say, the anchoring of the conduit 2 and adjustment of the anchoring position can be automatically carried out simultaneously in the simple manner.

Referring to FIGS. 1 and 3, it is clear that a distance between the bracket 40 and the input end (i.e. the connecting position of the end fitting 3) is constant both in case that the difference between the actual lengths of the inner cable 1 and the conduit 2 is large (FIG. 1) and in case that the difference is small (FIG. 3). Therefore, using the anchoring assembly of the present invention in the above embodiment, the reliable gear-change operation of the automatic transmission is provided.

Although one embodiment of the present invention has been explained, it is to be understood that the present invention is not limited in the above application, and various modifications or variations can be made as far as the spirit of the present invention is not changed.

According to the present invention, the accurate anchoring operation of the control cable to the correct anchoring position can be simply performed.

What we claim is:

1. The anchoring assembly comprising:
   (a) a sleeve to be coaxially fixed to one end of a conduit of a push-pull control cable from which an end of an inner cable projects, and having an external thread on an outer surface thereof;
   (b) a locknut having an internal thread on an inner surface thereof engaging with said external thread of said sleeve, said lockout being rotated and moved axially by an external force along, an axis of said sleeve;
   (c) a brake piece having a hole, said sleeve being passed slidably through said hole; and
   (d) an outer cap including a holder and a snap-in means, said outer ca having a longitudinal bore to allow said sleeve to pass through slidably, said holder holding the brake piece and said locknut, said snap-in means having a snap portion, wherein said brake piece and said locknut can be pressed against a rear side periphery of a penetrating hole of a bracket so that said locknut is prevented from rotating when said outer cap is inserted into said penetrating hole from said rear side and said snap portion expands to catch on to a front side periphery of said penetrating hole of said bracket, wherein a rotating movement of said brake piece is restricted.

2. The anchoring assembly of claim 1 wherein said inner cable is provided with a guide rod at an end.

3. The anchoring assembly of claim 1 wherein said external thread of said sleeve and said internal thread of said locknut are multiple threads.

4. The anchoring assembly of claim 1 wherein a spring is provided on said holder of said outer cap in order to apply an axial pressing force to said sleeve.

5. The anchoring assembly comprising:
   (a) a sleeve to be coaxially fixed to one end of a conduit of a push-pull control cable from which an end of an inner cable projects, and having an external thread on an outer surface thereof;
   (b) a locknut having an internal thread on an inner surface thereof engaging with said external thread of said sleeve, said locknut being rotated and moved axially by an external force along an axis of said sleeve;
   (c) a brake piece having a hole and a leg, said sleeve being passed slidably through said hole; and
   (d) an outer cap including a holder and a snap-in means, said outer cap having a longitudinal bore to allow said sleeve to pass through slidably, said holder holding the brake piece and said locknut, said snap-in means having a snap portion wherein said brake piece and said locknut can be pressed against a rear side periphery of a penetrating hole of a bracket so that a locknut is prevented from rotating when said outer cap is inserted into said penetrating hole from said rear side and said snap portion expands to catch on to a front side periphery of said penetrating hole of said bracket, wherein a rotating movement of said brake piece is restricted because of an engagement of said leg of said brake piece and a cutting of said holder.

* * * * *